(12) United States Patent
Bhattacharya

(10) Patent No.: US 10,912,133 B2
(45) Date of Patent: Feb. 2, 2021

(54) METHOD AND SYSTEM FOR WIRELESS COMMUNICATION BETWEEN SHORT RANGE RADIO FREQUENCY DEVICES WITHOUT PAIRING

(71) Applicant: ZERONE MICROSYSTEMS PVT. LTD., New Delhi (IN)

(72) Inventor: Jaijit Bhattacharya, New Delhi (IN)

(73) Assignee: ZERONE MICROSYSTEMS PVT. LTD., New Delhi (IN)

( * ) Notice: Subject to any disclaimer, the term of this patent is extended or adjusted under 35 U.S.C. 154(b) by 0 days.

(21) Appl. No.: 16/290,466

(22) Filed: Mar. 1, 2019

(65) Prior Publication Data

US 2020/0281033 A1  Sep. 3, 2020

(51) Int. Cl.
*H04W 76/14* (2018.01)
*H04W 60/04* (2009.01)
*H04W 8/00* (2009.01)
*H04W 4/80* (2018.01)
*H04W 76/11* (2018.01)

(52) U.S. Cl.
CPC ............. *H04W 76/14* (2018.02); *H04W 4/80* (2018.02); *H04W 8/005* (2013.01); *H04W 60/04* (2013.01); *H04W 76/11* (2018.02)

(58) Field of Classification Search
CPC ................................. H04W 4/80; H04W 60/02
See application file for complete search history.

(56) References Cited

U.S. PATENT DOCUMENTS

| | | | |
|---|---|---|---|
| 2011/0183614 A1* | 7/2011 | Tamura | H04M 1/7253 455/41.2 |
| 2012/0040639 A1* | 2/2012 | Brisebois | H04W 48/02 455/408 |
| 2013/0254050 A1* | 9/2013 | Zhu | G06Q 20/20 705/20 |
| 2016/0080892 A1* | 3/2016 | Basalamah | H04W 4/80 455/41.2 |
| 2018/0103499 A1* | 4/2018 | Lee | H04W 76/15 |
| 2018/0184464 A1* | 6/2018 | Fang | H04W 76/14 |

\* cited by examiner

*Primary Examiner* — Melanie Jagannathan
(74) *Attorney, Agent, or Firm* — Arent Fox, LLP

(57) ABSTRACT

A method for wireless communication of a single or plurality of data packets between short-range radio frequency (RF) devices in which the data packet(s) are transmitted from a single RF device to a single or plurality of receiving RF devices to enable communication of the data without establishing any bonding relationship between the devices. The method comprises assigning a unique name corresponding to the data packet to the transmitting RF device, detecting the name of the transmitting RF device by the single or plurality of receiving RF devices, and extracting the relevant data packet from the transmitting RF device by the single or plurality of receiving RF devices by decrypting the name of the transmitting RF device.

17 Claims, 3 Drawing Sheets

METHOD AND SYSTEM FOR WIRELESS COMMUNICATION BETWEEN SHORT RANGE RADIO FREQUENCY DEVICES WITHOUT PAIRING

TECHNICAL FIELD

The present invention relates in general to the field of information exchange among two or more short range radio frequency (RF) devices without pairing. The devices could be any devices that use Bluetooth technology including, but not limited to, phones, smart phones, PCs, Laptops, automobiles, scooters, Internet of Things (TOT) devices and the like.

BACKGROUND

Bluetooth is a wireless technology standard for exchanging data over short distances (using short-wavelength UHF radio waves in the ISM band from 2.4 to 2.485 GHz) from fixed and mobile devices, and building personal area networks (PANs).

Bluetooth uses a process called bonding, and a bond is generated through a process called pairing. The pairing process is triggered either by a specific request from a user to generate a bond (for example, the user explicitly requests to "Add a Bluetooth device"), or it is triggered automatically when connecting to a service where (for the first time) the identity of a device is required for security purposes. These two cases are referred to as dedicated bonding and general bonding respectively.

Pairing often involves some level of user interaction. This user interaction confirms the identity of the devices. When pairing successfully completes, a bond forms between the two devices, enabling those two devices to connect to each other in the future without repeating the pairing process to confirm device identities. When desired, the user can remove the bonding relationship.

However, the drawback which Bluetooth involves is that it does not, in the native form, allow for communication without a one to one pairing, which may happen with or without user intervention.

Thus, it is the object of the present invention to create a mechanism for communication using Bluetooth without the need for any explicit device to device pairing.

SUMMARY

According to an aspect of the present invention, a method for broadcasting a single or plurality of data packets from a transmitting short range radio frequency (RF) device to a single or plurality of receiving RF devices to enable data transmission without setting up any bonding relationship.

Another aspect of the invention resides in the provision of a system for wireless communication among short-range radio frequency (RF) devices comprises assigning a unique name corresponding to data Packet to the sending Bluetooth device, allowing the single or plurality of receiving Bluetooth device to detect the name of sending Bluetooth device; and extracting the relevant data packet from the sending Bluetooth device by the single or plurality of receiving Bluetooth device.

According to a further aspect of the invention, the data transmission from the sending Bluetooth device to the plurality of receiving Bluetooth device is a one to one data transmission.

According to yet another aspect of the present invention, the data transmission from the sending Bluetooth device to the plurality of receiving Bluetooth devices is a one to many data transmission.

BRIEF DESCRIPTION OF THE DRAWINGS

The invention will now be described in greater detail with reference to the accompanying drawings in which.

DETAILED DESCRIPTION

Figure 1:
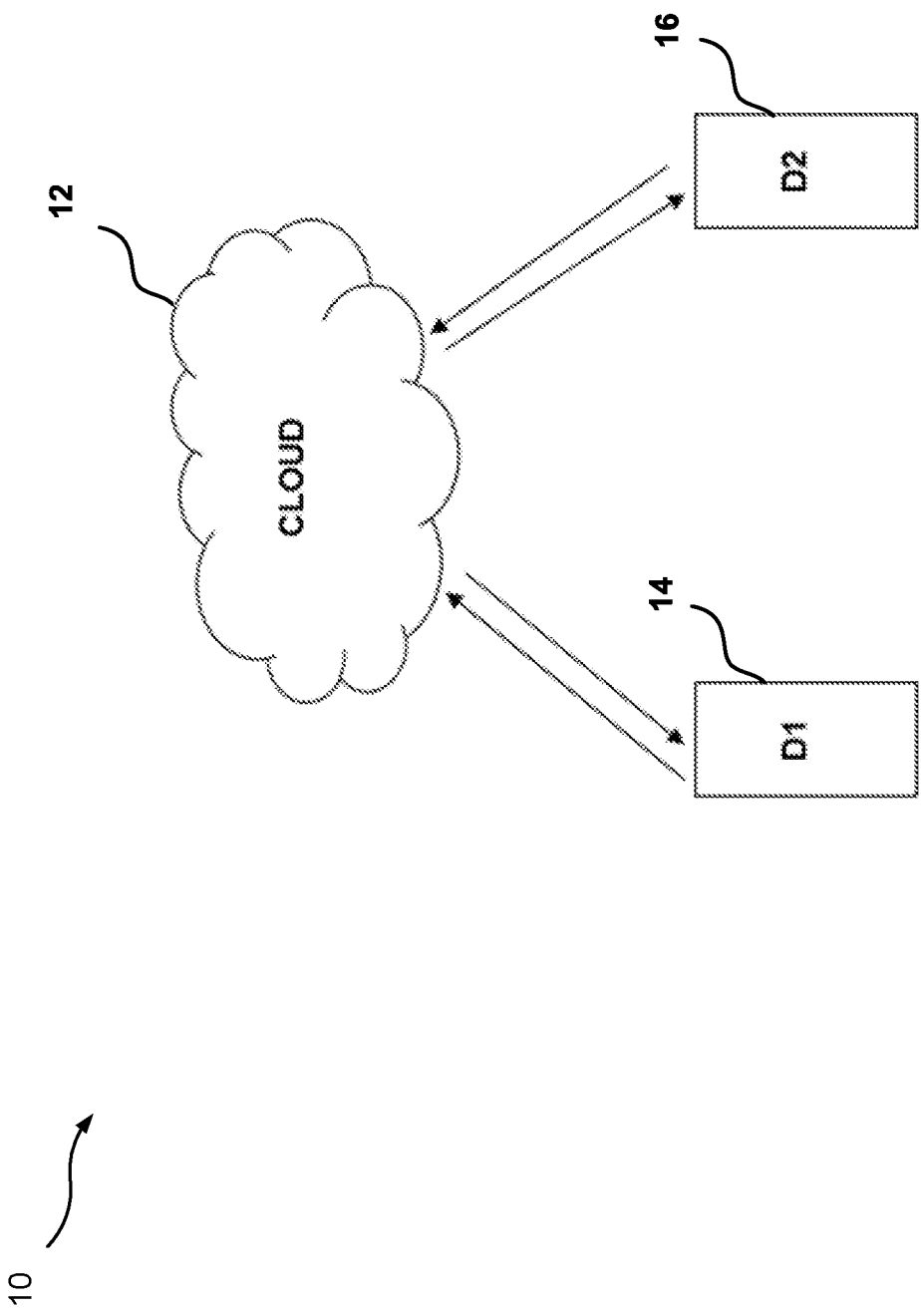
FIG. 1 is a graphic pictorial representation of the invention in operation with respect to two short-range radio frequency devices.

In view of the disadvantages inherent in the known types of data communication systems using Bluetooth technology establishing pairing between Bluetooth devices present in the prior art, the present invention provides an improved method and systems for setting up the data communication without initiating pairing of the devices.

The following disclosure comprises a simplified summary of the invention in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Using the Bluetooth technology for broadcasting information allows for a way of broadcasting that is quite different from any other currently known broadcasting technologies. Bluetooth broadcasting will most likely not be able to replace broadcasting systems like television and radio broadcasts, or even message transmission technologies like e-mail, SMS/MMS and instant messengers. However, Bluetooth broadcasting can be used in situations where the other technologies are not as suitable.

Bluetooth allows wireless transfer of data between devices using radio waves. While it is not nearly as fast as the standards used for wireless local area networks (Wi-Fi), it is cheaper to implement, and is designed for lower power consumption, making it ideal for portable devices like PDAs and mobile phones.

Each Bluetooth device has a unique address, also called Bluetooth ID or device ID.

This ID is usually not shown to users, as the more user friendly customizable device name is used for identifying Bluetooth devices.

Many mobile phones also let users use Bluetooth for transferring data with other phones or with computers. Other computer peripherals that have Bluetooth versions include printers and input devices like mice and keyboards Any Bluetooth device in discoverable mode transmits the following information on demand: device name, device class, list of services, and technical information (for example, device features, manufacturer, Bluetooth specification used, clock offset).

Any device may perform an inquiry to find other devices to connect to and any device can be configured to respond to such inquiries. However, if the device trying to connect knows the address of the device, it always responds to direct connection requests and transmits the information shown in the list above if requested. Use of a device's services may require pairing or acceptance by its owner, but the connection itself can be initiated by any device and held until it goes out of range. Some devices can be connected to only one device at a time, and connecting to them prevents them from connecting to other devices and appearing in inquiries until they disconnect from the other device.

Every device has a unique 48-bit address. However, these addresses are generally not shown in inquiries. Instead, friendly Bluetooth names are used, which can be set by the user. This name appears when another user scans for devices and in lists of paired devices.

However, an aspect of the present invention provides a method for wireless communication of a single or plurality of data packets between short-range radio frequency (RF) devices in which said data packet(s) are transmitted from a single RF device to a single or plurality of receiving RF devices to enable communication of said data without establishing any bonding relationship between the devices, said method comprising: assigning a unique name corresponding to the data packet to the transmitting RF device; detecting the name of the transmitting RF device by the single or plurality of receiving RF devices; and extracting the relevant data packet from the transmitting RF device by the single or plurality of receiving RF devices by decrypting the name of the transmitting RF device.

In an aspect, an example of short-range radio frequency (RF) devices are Bluetooth devices.

The data transmission from the transmitting RF device to the plurality of receiving RF devices can be a one to one data transmission or one to many data transmission.

According to the inventive method, the plurality of data packets are exchanged by broadcasting the changing data packets as a series of changing device names of the transmitting RF device.

The change of name of the transmitting RF device from one data packet to another occurs as a result of a trigger embedded in the data packet being transferred. This trigger may be a temporal trigger or an event based trigger.

According to further aspect of the invention, the transmitting RF device can be triggered to change its role from a transmitting device to a receiving device by the temporal trigger or event based trigger.

Referring to FIG. 1, a system 10 for wireless communication of a single or plurality of data packets among short-range radio frequency (RF) devices in which said data packet(s) are transmitted from a single RF device to a single or plurality of receiving RF devices to enable communication of said data without establishing any bonding relationship between the devices. The system 10 includes: a transmitting device (D1) 14 for transmitting a data packet corresponding to which an encrypted name is assigned to the transmitting device 14; a server (e.g., in the cloud) 12 storing the data packet which is uploaded by the transmitting device 14, said packet being identified by a unique identifier; and a receiving device (D2) 16 for extracting the data packet by decrypting the name of the transmitting device 14 without establishing any bonding relationship.

According to an aspect of the system 10, a standard identifier or a predefined identifier is used in identifying the transmitting RF device 14.

The encrypted name comprises the combination of the standard identifier and the unique identifier or the combination of the predefined identifier and the unique identifier.

The unique name is scanned by the receiving RF device 16 to identify the standard identifier or the predefined identifier and the unique identifier is extracted by the receiving RF device 16 to fetch the data from the server 12 by using the unique identifier.

Figure 2:
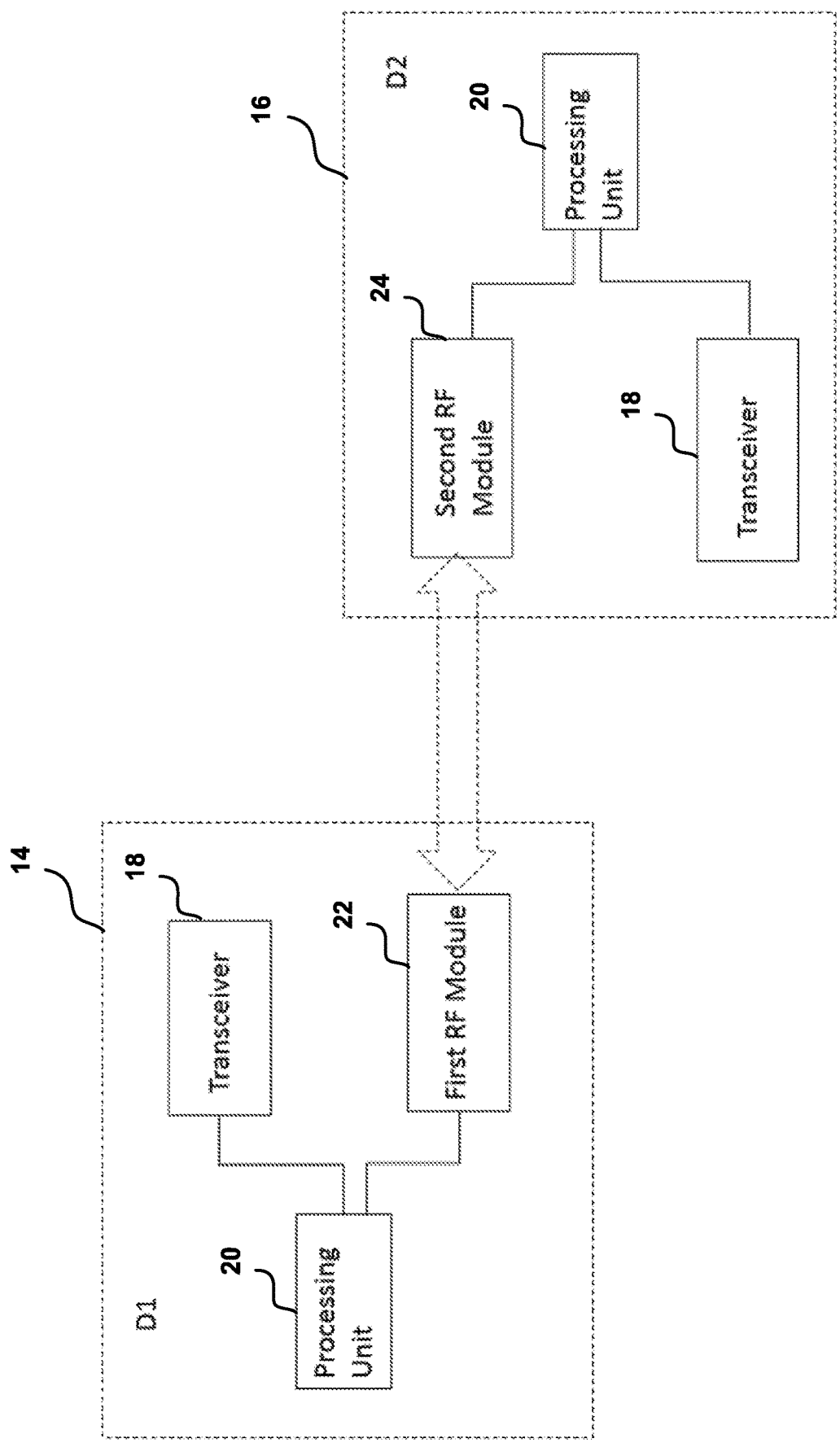
FIG. 2 is a block diagram of each of the two devices of FIG. 1.

Referring to FIG. 2, each one of the transmitting RF device 14 and the receiving RF device 16 may include a processing unit 20 and a transceiver 18. Further, the transmitting RF device 14 may include a first RF module 22 configured for communication with a second RF module 24 in the receiving RF device 16.

The description which follows identifies in detail the operation of the aspects with respect to two forms of data transmission: static data transmission and dynamic data transmission.

Static Data Transmission

Figure 3:
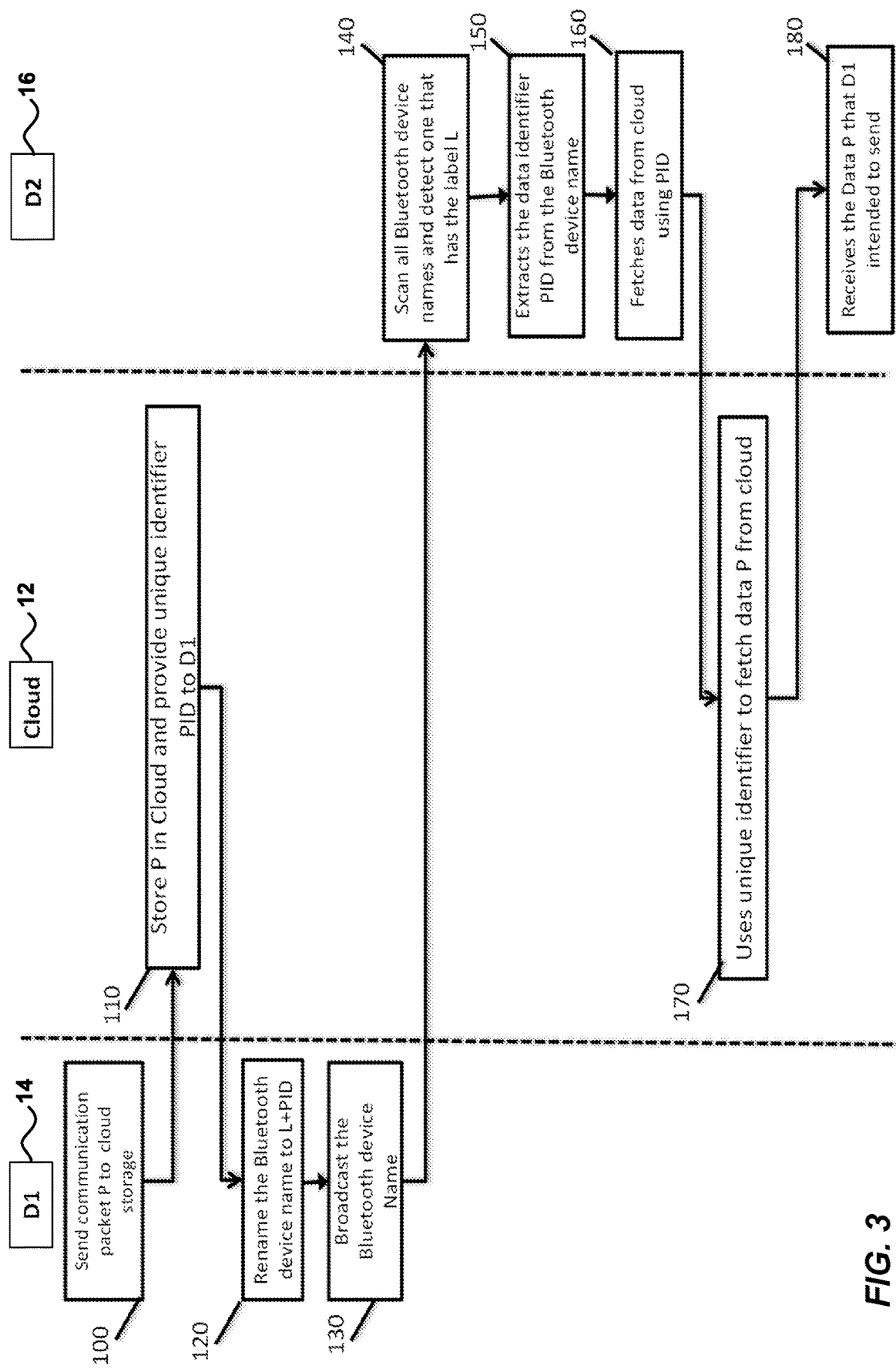
FIG. 3 is a further depiction in block diagrammatic form of the system according to the present invention.

Referring to FIG. 3, according to an aspect of the invention, at step 100, a Bluetooth sending device D1 14, that wants to send out limited data P, to one or more receiving devices D2 to Dn, without pairing with any of them, uploads the data P to a cloud storage 12 and creates a unique identifier for the data P in the cloud, say PID at step 110. At step 120, device D1 14 then renames its Bluetooth name to a predefined label L and the data identifier PID, that is to be sent out or to be broadcast in step 130.

At step 140 a receiving device D2 16 scans the list of Bluetooth device names being broadcast and identifies the Bluetooth name that has the label L. At step 150 device D2 16 then extracts the data identifier PID from the Bluetooth device name. It uses the data identifier PID to fetch the original data P from the cloud 12 that device D1 14 intended to send (Steps 160, 170, and 180), thus completing the communication without bonding/pairing with the sending Device D1 14. Device D2 16 therefore receives the initially intended data packet P from D1 14, using Bluetooth, without bonding/pairing of the devices.

Device D1 14 may embed a standard identifier, such as "DTXN" as a label in any part of the name P, of its Bluetooth (referred to as label L in the earlier paragraph). Assuming the standard identifier adopted "DTXN" is agreed to precede the data P as the Bluetooth device, then the Bluetooth device name becomes "DTXN+P". The receiving device D2 16, can then differentiate between the various Bluetooth device names being broadcast and identify the name that carries the data P by checking if the Bluetooth device name has the pre-decided identifier (in this case DTXN) preceding the name of the Bluetooth device, without bonding with the sending device D1 14.

The mechanism may be used for one to one communication as well as one to many (broadcast) communication. In broadcast, multiple receiving devices, D2 to Dn, detect the Bluetooth sending device name and extract the intended data packet P, without bonding with the sending device D1 14.

Dynamic Data Transmission

The description immediately above describes the method which of static data, i.e., data P which is not changing.

In another aspect of the invention, the above defined mechanism is further evolved to transmit and receive dynamic data, which keeps on changing.

Sending Device D1 14, wants to send out a series of data packets P1 to Pn. Device D1 14 then follows the method for sending out the packets P1, P2 to Pm in a sequential form, by adopting the method to send one data packet P1, by changing the name of its Bluetooth device to a concatenation of an identifier and P1. Thereafter, based on a temporal or event trigger, Device D1 14 changes its Bluetooth device name to a concatenation of the identifier and P2. Thus, all the data packets, P1, P2 to Pm can be transmitted using the same mechanism.

The receiving devices D2 to Dn can keep tracking the Bluetooth device name of D1 14 and extract the packets P1, P2 to Pm, without bonding using Bluetooth with the Device D1 14.

In certain aspects, the receiving device D2 16 may choose to send data packets and the sending device D1 14 may want to receive data packets. This may be triggered by a temporal trigger (preset time periods) or may be triggered by an event. The event trigger may be the information embedded in the data packet sent by D1 14 that triggers D2 16 to switch to a sender from a receiver. When D1 14 detects a Bluetooth device with the standard identifier, say DTXN, it presumes that D2 16 has received the event trigger to switch to becoming a sender and thus D1 14 also switches to becoming a receiver.

It is therefore submitted that the present invention has been shown and described in what is considered to be the most practical and preferred aspects. It is recognized, however, that departures may be made within the scope of the invention and that obvious modifications will occur to a person skilled in the art.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is to be considered as only illustrative of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A method for wireless communication of a single or plurality of data packets between short-range radio frequency (RF) devices in which the single or plurality of data packets are transmitted from a transmitting RF device to a single or plurality of receiving RF devices to enable communication of data without establishing any bonding relationship between the short-range RF devices, the method comprising:
    assigning unique names corresponding to the single or plurality of data packets to the transmitting RF device;
    transmitting the single or plurality of data packets by broadcasting a series of changing device names of the transmitting RF device corresponding to the single or plurality of data packets;
    detecting a name of the transmitting RF device by the single or plurality of receiving RF devices; and
    extracting a relevant data packet from the transmitting RF device by the single or plurality of receiving RF devices by decrypting the name of the transmitting RF device.

2. The method as claimed in claim 1, wherein the short-range RF devices are Bluetooth devices.

3. The method as claimed in claim 1, wherein data transmission from the transmitting RF device to the plurality of receiving RF devices is a one to one data transmission.

4. The method as claimed in claim 1, wherein data transmission from the transmitting RF device to the plurality of receiving RF devices is a one to many data transmission.

5. The method as claimed in claim 1, wherein a change of name of the transmitting RF device from one data packet to another occurs as a result of a temporal trigger embedded in a data packet being transferred.

6. The method as claimed in claim 1, wherein a change of name of the transmitting RF device from one data packet to another occurs as a result of an event based trigger.

7. The method as claimed in claim 1, wherein the transmitting RF device is triggerable to change its role from a transmitting device to a receiving device by a temporal trigger or an event based trigger.

8. The method as claimed in claim 1, wherein the single or plurality of receiving RF devices is triggerable to change its role from a receiving device to a transmitting device by a temporal trigger or an event based trigger.

9. The method as claimed in claim 1, wherein at least one of the transmitting RF device or the single or plurality of receiving RF devices is a phone, a smart phone, a PC, a laptop, a vehicle, or an Internet of Things (IoT) device.

10. A system for wireless communication of a single or plurality of data packets among short-range radio frequency (RF) devices in which the single or plurality of data packets are transmitted from a transmitting RF device to a single or plurality of receiving RF devices to enable communication of data without establishing any bonding relationship between the short-range RF devices, the system comprising:
    a transmitting device for transmitting the single or plurality of data packets corresponding to which encrypted name is names are assigned to the transmitting device by broadcasting a series of changing device names of the transmitting device corresponding to the single or plurality of data packets;
    a server storing the single or plurality of data packets which are uploaded by the transmitting device, the packet single or plurality of data packets being identified by a unique identifier; and
    a receiving device for extracting the single or plurality of data packets by decrypting the series of changing device names of the transmitting device without establishing any bonding relationship, wherein an event trigger is embedded in the single or plurality of data packets to trigger an event, said event trigger triggering a change of name of the transmitting device whenever a new data packet identified by the unique identifier is transferred.

11. The system as claimed in claim 10, wherein the short-range RF devices are Bluetooth devices.

12. The system as claimed in claim 10, wherein a standard identifier or a predefined identifier is used in identifying the transmitting device.

13. The system as claimed in claim 12, wherein the encrypted names comprise a first combination of the standard identifier and the unique identifier, or wherein the encrypted names comprise a second combination of the predefined identifier and the unique identifier.

14. The system as claimed in claim 13, wherein the encrypted names are scanned by the receiving device to identify the standard identifier or the predefined identifier.

15. The system as claimed in claim 14, wherein the unique identifier is extracted by the receiving device to fetch the data from the server by using the unique identifier.

16. The system as claimed in claim 10, wherein the event includes a sequential transmission of various data packets.

17. The system as claimed in claim 10, wherein the event includes a change of a role of the receiving device to the transmitting device or vice-versa.

\* \* \* \* \*